(12) United States Patent
Do et al.

(10) Patent No.: US 9,343,779 B2
(45) Date of Patent: May 17, 2016

(54) METHOD OF PREPARING ELECTRODE ASSEMBLY AND ELECTRODE ASSEMBLY PREPARED USING THE METHOD

(71) Applicant: LG Chem, Ltd., Seoul (KR)

(72) Inventors: Hyun Kyung Do, Daejeon (KR); Jong Mo Jung, Daejeon (KR); You Rim Yoon, Daejeon (KR); Young Geun Choi, Daejeon (KR); Joo Young Choi, Daejeon (KR); Seung Jae Yoon, Daejeon (KR); Jong Hyun Chae, Daejeon (KR); Jae Kyung Kim, Daejeon (KR)

(73) Assignee: LG Chem, Ltd. (KR)

( * ) Notice: Subject to any disclaimer, the term of this patent is extended or adjusted under 35 U.S.C. 154(b) by 41 days.

(21) Appl. No.: 14/256,449

(22) Filed: Apr. 18, 2014

(65) Prior Publication Data

US 2014/0227583 A1 Aug. 14, 2014

Related U.S. Application Data

(63) Continuation of application No. PCT/KR2013/010687, filed on Nov. 22, 2013.

(30) Foreign Application Priority Data

Nov. 23, 2012 (KR) .................. 10-2012-0133738

(51) Int. Cl.
| | |
|---|---|
| *H01M 10/04* | (2006.01) |
| *H01M 10/0525* | (2010.01) |
| *H01M 10/0585* | (2010.01) |
| *H01M 4/139* | (2010.01) |
| *H01M 10/0583* | (2010.01) |
| *H01M 10/0565* | (2010.01) |

(52) U.S. Cl.
CPC .......... *H01M 10/0585* (2013.01); *H01M 4/139* (2013.01); *H01M 10/0431* (2013.01); *H01M 10/0525* (2013.01); *H01M 10/0583* (2013.01); *H01M 10/045* (2013.01); *H01M 10/0565* (2013.01); *Y02E 60/122* (2013.01); *Y02P 70/54* (2015.11); *Y10T 29/49115* (2015.01)

(58) Field of Classification Search
None
See application file for complete search history.

(56) References Cited

U.S. PATENT DOCUMENTS

| | | | |
|---|---|---|---|
| 6,679,926 B1 | 1/2004 | Kajiura et al. | |
| 7,033,701 B2* | 4/2006 | Hong | ........................ 429/231.95 |
| 2002/0160257 A1 | 10/2002 | Lee et al. | |
| 2002/0160258 A1 | 10/2002 | Lee et al. | |
| 2003/0013012 A1 | 1/2003 | Ahn et al. | |
| 2010/0015529 A1 | 1/2010 | Kim et al. | |
| 2011/0039140 A1 | 2/2011 | Miyahisa et al. | |
| 2011/0081570 A1 | 4/2011 | Jang et al. | |
| 2012/0058387 A1 | 3/2012 | Ahn | |
| 2012/0225345 A1 | 9/2012 | Kim | |
| 2012/0237819 A1* | 9/2012 | Ahn | .............................. 429/163 |

FOREIGN PATENT DOCUMENTS

| | | |
|---|---|---|
| EP | 0831228 A2 | 3/1998 |
| JP | 2006-092973 A | 4/2006 |
| JP | 2011-081931 A | 4/2011 |
| KR | 20010019700 A | 3/2001 |
| KR | 2001-0082058 A | 8/2001 |
| KR | 2001-0082059 A | 8/2001 |
| KR | 2001-0082060 A | 8/2001 |
| KR | 100303119 | 11/2001 |
| KR | 20070110563 A | 11/2007 |
| KR | 100907623 B1 | 7/2009 |
| KR | 2011-0112241 A | 10/2011 |
| KR | 20120022385 A | 3/2012 |

* cited by examiner

*Primary Examiner* — Ladan Mohaddes
(74) *Attorney, Agent, or Firm* — Lerner, David, Littenberg, Krumholz & Mentlik, LLP

(57) ABSTRACT

Provided are a method of preparing an electrode assembly, in which both sides of a single current collector are coated to form an anode and a cathode, and the current collector is then bent into a vertical sectional zigzag shape and integrated in a state of disposing a separator at interfaces between facing electrode patterns, an electrode assembly prepared by the above method, and a secondary battery comprising the electrode assembly.

15 Claims, 3 Drawing Sheets

METHOD OF PREPARING ELECTRODE ASSEMBLY AND ELECTRODE ASSEMBLY PREPARED USING THE METHOD

CROSS-REFERENCE TO RELATED APPLICATIONS

This application is a continuation of International Patent Application No. PCT/KR2013/010687, filed Nov. 22, 2013, which claims the benefit of Korean Patent Application No. 10-2012-0133738, filed Nov. 23, 2012, the disclosures of which are incorporated herein by reference.

BACKGROUND OF THE INVENTION

1. Field of the Invention

The present invention relates to a method of preparing an electrode assembly, in which both sides of a single current collector are coated to form an anode and a cathode, and the current collector is then bent into a vertical sectional zigzag shape and integrated in a state of disposing a separator at interfaces between facing electrode patterns, and an electrode assembly prepared by the method.

2. Description of the Related Art

Demand for secondary batteries as an energy source has been significantly increased as technology development and demand with respect to mobile devices have increased. Among these secondary batteries, lithium secondary batteries having high energy density and high voltage, long cycle lifetime, and low self-discharge rate have been commercialized and widely used.

Lithium secondary batteries are classified as a lithium-ion battery, a lithium-ion polymer battery, and a lithium polymer battery according to the configurations of an electrode assembly having a structure of cathode/separator/anode and an electrolyte solution.

Also, the lithium secondary batteries are broadly categorized as a jelly-roll type (winding-type) and a stack-type (laminate-type) according to the structure of the electrode assembly. For example, a jelly-roll type electrode assembly is prepared in such a manner that a metal foil used as a current collector is coated with an electrode active material, dried, and pressed to prepare an electrode, the electrode is cut in the shape of a band having desired width and length, and the jelly-roll type electrode assembly is then prepared by separating a cathode and an anode using a separator and winding the resultant product in a spiral shape. The jelly-roll type electrode assembly is appropriate for a cylindrical type battery. However, the jelly-roll type electrode assembly may have disadvantages, such as the exfoliation of the electrode active material and low space utilization, when used in a prismatic type or pouch type battery. The stack-type electrode assembly has a structure in which a plurality of cathode and anode units are sequentially stacked, wherein the stack-type electrode assembly may have advantages in that a prismatic shape may be easily obtained, but may have disadvantages in that a preparation process is cumbersome and an electrode is pushed to cause a short circuit when an impact is applied thereto.

In order to address the above limitations, an electrode assembly having a structure, in which a predetermined sized full cell composed of cathode/separator/anode or a predetermined sized bi-cell composed of cathode (anode)/separator/anode (cathode)/separator/cathode (anode) is sequentially stacked to allow the cathode and the anode to face each other in the state of disposing a long continuous separation film therebetween, was developed as described in Korean Patent Application Laid-Open Publication Nos. 2001-82058, 2001-82059, and 2001-82060.

A structure of such a layered electrode assembly may be identified by schematic views of preparing processes illustrated in FIGS. 1A and 1B.

Referring to FIGS. 1A and 1B, since a layered electrode assembly 10 is prepared through various processes, such as a process of cutting a cathode 1, an anode 2, and a separator 5 to a predetermined size, a process of preparing a bi-cell 6 (or full cell) by sequentially stacking the cut cathode 1, anode 2, and separator 5 (see FIG. 1A), a process of folding the bi-cell 6 thus prepared by using a separation film 7 (see FIG. 1B), and a process of electrically connecting electrode tabs 3 and 4 protruding from one sides of the cathode 1 and the anode 2, a preparation process is cumbersome and preparation costs and time according to the number of processes may be increased. Also, in the process of connecting the electrode tabs 3 and 4, since a separate connecting member is not only essential but difficult work, such as welding, is also performed, this may be a cause of increasing the probability of generating defects of a battery as well as manufacturing costs.

Recently, in order to improve such limitations, a method of preparing a vertical sectional zigzag-shaped electrode assembly, instead of an electrode assembly having stack-type and layered stack structures, is known.

For example, Korean Patent No. 10-0907623 discloses a method of preparing an electrode assembly for a secondary battery in which an electrode having one side of a current collector coated with an active material layer is bent in a vertical sectional zigzag shape and the electrode is fit to allow the active material layers to face each other in a state of disposing a separator therebetween.

However, similar to a typical layered electrode assembly, since the method requires a process of preparing electrode units by respectively coating the electrode current collectors with cathode and anode active materials and aligning the separator therebetween, the method has fundamental limitations.

Also, Korean Patent No. 10-0303119 discloses a method of preparing an electrode assembly in which electrode sheet and separator are prepared in a stack structure of cathode/separator/anode/separator and the stack structure is then folded in a zigzag shape.

However, in this method, since each electrode is also formed on each electrode current collector and an electrode assembly is then formed by bending the stack structure of the electrodes and separators, a process of bending is not facilitated due to a predetermined thickness of each electrode and separator, and also, the electrode active material layer on the current collector may be exfoliated in the process of applying force to perform the bending process.

Thus, an electrode assembly prepared by a typical stack, stack and folding, or folding method may have limitations in that an amount of a current collector used for preparing an electrode is large or an entire structure is distorted during the preparation or expansion of a battery. In particular, since a cathode and an anode are each prepared in a separate two-step process despite the fact that current collector materials for preparing the cathode and the anode are the same, preparation costs and time may increase.

Therefore, there is a need to develop a new technique for preparing an electrode assembly which may fundamentally resolve the above limitations and may simultaneously reduce preparation costs and time.

SUMMARY OF THE INVENTION

An aspect of the present invention provides a method of preparing a layered electrode assembly, in which both sides of a single current collector are coated to form an anode and a cathode, and the current collector is then bent into a vertical sectional zigzag shape and integrated in a state of disposing a separator at interfaces between facing electrode patterns.

Another aspect of the present invention provides a layered electrode assembly prepared by the above method.

Another aspect of the present invention provides a secondary battery comprising the layered electrode assembly.

According to an aspect of the present invention, there is provided a method of preparing an electrode assembly comprising: preparing a single current collector; respectively and repeatedly coating both sides of the single current collector with a cathode active material and an anode active material to form one or more anode patterns and cathode patterns that are spaced apart by a predetermined spacing and one or more non-coating portions on which the active materials are not coated; bending the one or more non-coating portions, on which the active materials are not coated, into a vertical sectional zigzag shape; disposing a separator at respective interfaces between the cathode patterns and the anode patterns that face each other by the bending, and folding the single current collector; and cutting the one or more bent non-coating portions on which the active materials are not coated.

Specifically, the electrode assembly prepared by the method of the present invention may be a layered electrode assembly.

The current collector is formed of a material which may collect electrons generated by electrochemical reactions of the integrally formed cathode and anode active materials or may supply electrons required for the electrochemical reactions, and for example, may be an aluminum foil or a copper foil.

In this case, the cathode active material may include one or more cathode active materials selected from the group consisting of $LiCoO_2$, $LiNiO_2$, $LiMn_2O_4$, $LiCoPO_4$, $LiFePO_4$, $LiNiMnCoO_2$, and $LiNi_{1-x-y}Co_xM1_yM2_zO_2$ (where M1 and M2 are each independently any one selected from the group consisting of aluminum (Al), nickel (Ni), cobalt (Co), iron (Fe), manganese (Mn), vanadium (V), chromium (Cr), titanium (Ti), tungsten (W), tantalum (Ta), magnesium (Mg), and molybdenum (Mo), and x, y, and z are each independently an atomic fraction of each component in the oxide, in which $0 \le x < 0.5$, $0 \le y < 0.5$, $0 \le z < 0.5$, and $x+y+z=1$). Also, the anode active material may include one or more anode active materials selected from the group consisting of natural graphite, artificial graphite, and a carbonaceous material; lithium-containing titanium composite oxides (LTO); metals (Me) such as silicon (Si), tin (Sn), lithium (Li), zinc (Zn), Mg, cadmium (Cd), cerium (Ce), Ni, or Fe; alloys formed of the metals (Me); oxides ($MeO_x$) of the metals (Me); and composites of the metals (Me) and carbon.

The both sides of the single current collector may be pattern coated with the cathode active material and the anode active material, and in this case, a slit die method, 3-roll reverse (comma roll) method, or shutter method may be used according to the shape of a coater head.

The method of the present invention may further include drying and pressing after the repeatedly coating of the both sides of the current collector with the cathode active material and the anode active material.

In the method of the present invention, widths of the cathode pattern and the anode pattern are the same.

Also, the non-coating portions, on which the active materials are not coated, are corner portions that are bent in the zigzag-shaped electrode and may be arranged by a predetermined spacing along a direction of the bending. A width of the electrode assembly may be determined according to a distance between two adjacent folded portions. Specifically, a width of the non-coating portion may be in a range of about 5% to about 10% based on a total width of the electrode pattern to facilitate subsequent bending process and cutting process.

Also, a marking for facilitating the bending process may be formed on a portion to be folded in the non-coating portion. The marking may include a plurality of holes that are perforated at predetermined spaced intervals along the portion to be folded.

Furthermore, the method of the present invention may form predetermined sized portions, on which the electrode active materials are not coated, at one side end or both side ends of the current collector to further attach electrode leads for electrical connection.

In the method of the present invention, the separator is a porous thin film formed of an insulating material that may be used in a lithium secondary battery, and specifically, may include a porous substrate prepared from a polyolefin-based polymer selected from the group consisting of an ethylene homopolymer, a propylene homopolymer, an ethylene-butene copolymer, an ethylene-hexene copolymer, and an ethylene-methacrylate copolymer; a porous substrate prepared from a polymer selected from the group consisting of polyester, polyacetal, polyamide, polycarbonate, polyimide, polyetheretherketone, polyethersulfone, polyphenylene oxide, polyphenylene sulfide, and polyethylene naphthalene; or a porous substrate formed of a mixture of inorganic particles and binder polymer. However, the separator is not limited thereto.

Also, the method of the present invention may further include integrating by folding the separator and the electrodes while applying heat and pressure in a state of disposing the separator at the interfaces between the facing cathode patterns and anode patterns. A lamination structure, in which unit cells composed of the cathode pattern/first separator/the anode pattern/second separator are alternatingly stacked, may be formed by the above operation.

Furthermore, in the method of the present invention, removing the one or more bent non-coating portions, on which the active materials are not coated, by cutting is performed in order to prevent a short circuit of the lamination structure.

In this case, a typical metal cutting or punching method may be used in the cutting.

According to another aspect of the present invention, there is provided a (layered) electrode assembly having a lamination structure in which unit cells composed of the cathode pattern, the separator, the anode pattern, and the separator are alternatingly stacked.

According to another aspect of the present invention, there is provided a secondary battery including the (layered) electrode assembly. In this case, the secondary battery may be a lithium-ion polymer battery.

ADVANTAGEOUS EFFECT

As described above, since a method according to the present invention may not only simplify a process of preparing an electrode assembly but may also reduce amounts of current collector and separator that are used during the preparation of the electrode assembly, manufacturing costs and time of a battery may be reduced. Thus, productivity may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DESCRIPTION OF THE SYMBOL 100, 200: current collectors
110, 210: anode patterns
120, 220: cathode patterns
115: non-coating portions
125: markings (holes)
215: bent portions

DETAILED DESCRIPTION OF THE PREFERRED EMBODIMENT

Hereinafter, the present invention will be described in more detail with reference to the accompanying drawings. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Figure 1A:
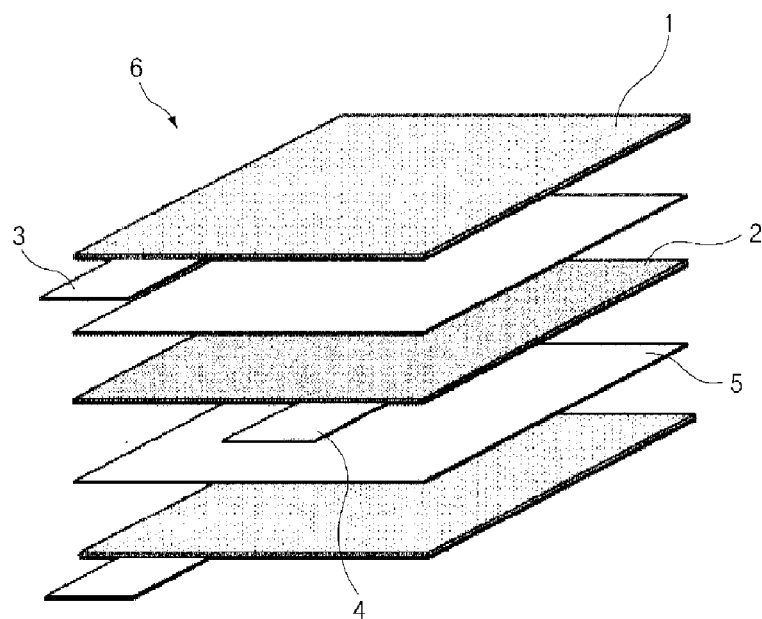
FIGS. 1A and 1B are schematic views illustrating a structure of a layered electrode assembly according to a prior art.
Figure 1B:
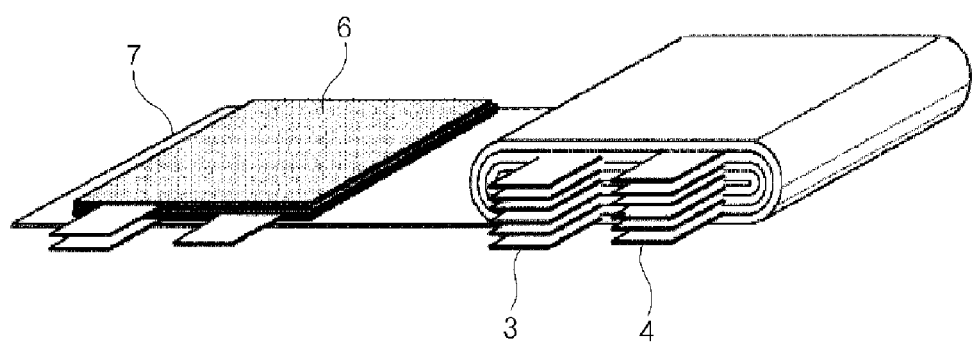
Figure 2:
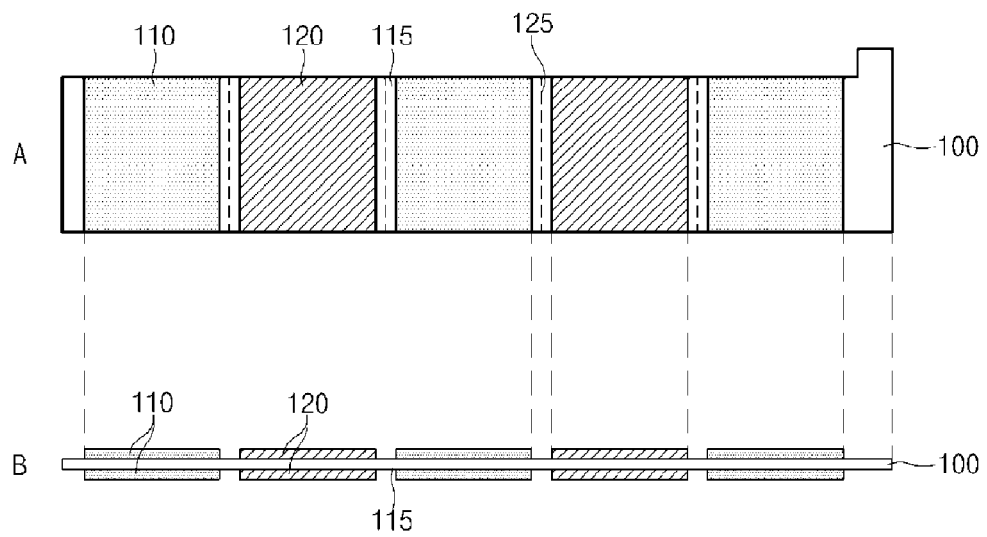
FIG. 2 is a plan view (A) and a cross-sectional view (B) illustrating an electrode assembly according to an embodiment of the present invention before bending.
Figure 3:
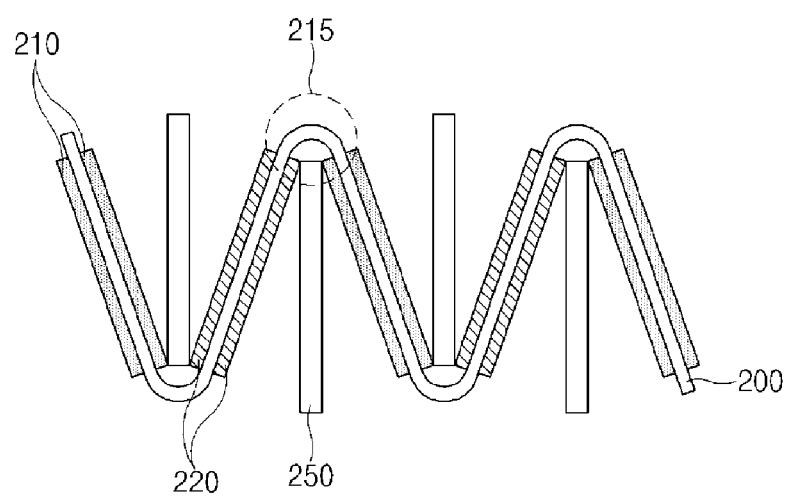
FIG. 3 is a cross-sectional view illustrating the electrode assembly according to the embodiment of the present invention after bending.
Figure 4:
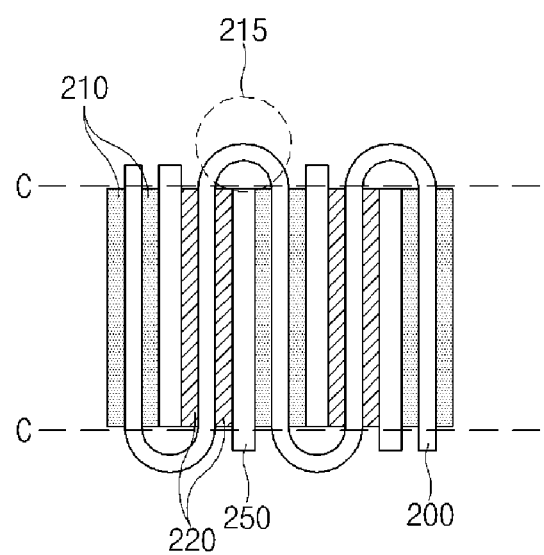
FIG. 4 is a cross-sectional view illustrating the electrode assembly according to the embodiment of the present invention during cutting (C).

FIG. 2 is a plan view (A) and a cross-sectional view (B) illustrating an electrode assembly according to an embodiment of the present invention before a bending operation, FIG. 3 is a cross-sectional view illustrating the electrode assembly according to the embodiment of the present invention after the bending operation, and FIG. 4 is a cross-sectional view illustrating the electrode assembly according to the embodiment of the present invention during a cutting (C) operation.

First, referring to FIG. 2, both sides of a single current collector 100 is respectively and repeatedly coated with a cathode active material and an anode active material, and then dried and pressed to form one or more anode patterns 110, cathode patterns 120, and non-coating portions 115 on which the electrode materials are not coated, which are spaced apart by a predetermined spacing.

In this case, in order to easily perform a subsequent bending process, markings 125 including a plurality of holes that are perforated at predetermined spaced intervals may be formed in the non-coating portion.

Widths of the cathode pattern and the anode pattern are the same, and the one or more non-coating portions 115 on which the electrode materials are not coated may be formed to have a width of about 5% to about 10% based on a total width of the cathode or anode patterns in order to easily perform the subsequent bending process and a cutting process.

Also, electrode leads (not shown) for electrical connection may be further attached to the predetermined sized portions, on which the active materials are not coated, formed on one side or both side ends of the electrode current collector 100.

Next, referring to FIG. 3, non-coating portions of a current collector 200, on which anode patterns 210 and cathode patterns 220 are not formed, are bent 215 into a vertical-sectional zigzag shape.

Subsequently, the current collector is folded in a state of disposing a separator 250 at interfaces between the anode patterns 210 and the cathode patterns 220 facing each other by the bending process while applying heat and pressure. As a result, the separator is fixed by being heat fused at the interfaces between the anode patterns 210 or the cathode patterns 220.

In this case, the separator may be a porous thin film formed of an insulating material.

Also, the heat and pressure processes for fixing the separator is not particularly limited and may be used by being appropriately varied according to the kinds of the electrode and the separator.

According to the above processes, as illustrated in FIG. 4, a lamination structure is formed in which both sides of the current collector 200 are repeatedly coated with the anode patterns 210 and the cathode patterns 220 and unit cells formed by disposing the separator 250 on the interfaces between the facing patterns are alternatingly stacked.

Subsequently, a short-circuit protected layered electrode assembly is formed by cutting (c) the non-coating portions of the lamination structure, i.e., the bent portions 215.

In this case, the cutting may be performed using typical metal cutting and punching methods.

A secondary battery including the layered electrode assembly may be prepared by the method of the present invention.

In the present invention, the secondary battery may be a lithium-ion polymer battery.

Components constituting the lithium-ion polymer secondary battery and preparation method are not particularly limited and the components and the preparation method that are known in the art may be used.

Hereinafter, the present invention will be described in detail, according to specific examples. However, the following examples are merely presented to exemplify the present invention, and the scope of the present invention is not limited thereto.

EXAMPLES

Example 1

A cathode mixture slurry was prepared by adding 95 wt % of $LiCoO_2$ as a cathode active material, 2.5 wt % of Super-P (conductive agent), and 2.5 wt % of polyvinylidene fluoride (PVdF) (binder) to N-methyl-2-pyrrolidone (NMP) as a solvent, and an anode mixture slurry was prepared by adding 95 wt % of artificial graphite as an anode active material, 2.5 wt % of Super-P (conductive agent), and 2.5 wt % of PVdF (binder) to NMP as a solvent.

Subsequently, both sides of a copper foil, in which holes were perforated at predetermined spaced intervals, were respectively pattern coated with the cathode active material and the anode active material, and then dried and pressed to integrally form a cathode and an anode on a single current collector.

The current collector having the cathode and the anode integrally formed thereon was bent along perforated portions to obtain a vertical-sectional zigzag shape. Subsequently, Cell Guard™ as a separator was disposed at an interface between the anode and the cathode that faced each other by the bending and the current collector was then folded.

Thereafter, a layered electrode assembly was prepared by cutting the bent portions of the current collector, and a battery was then prepared by putting the electrode assembly in a battery case and injecting an electrolyte solution.

Comparative Example 1

A cathode mixture slurry was prepared by adding 95 wt % of $LiCoO_2$ as a cathode active material, 2.5 wt % of Super-P (conductive agent), and 2.5 wt % of PVdF (binder) to NMP as a solvent. Then, one side of an aluminum foil was coated with the cathode mixture slurry, and dried and pressed to prepare a cathode.

An anode mixture slurry was prepared by adding 95 wt % of artificial graphite as an anode active material, 2.5 wt % of Super-P (conductive agent), and 2.5 wt % of PVdF (binder) to NMP as a solvent. Then, one side of a copper foil was coated with the anode mixture slurry, and dried and pressed to prepare an anode.

Celgard™ was used as a separator, and the cathode and the anode were bent to obtain a vertical-sectional zigzag shape. Then, an electrode assembly was prepared by fitting to allow active material layers of the cathode and the anode to face each other, having the separator, which was bent in the above shape, disposed therebetween. A battery was prepared by putting the electrode assembly in a battery case and then injecting an electrolyte solution thereinto.

When comparing the batteries prepared in the example and the comparative example, capacities were similar to each other. However, with respect to the battery of the present invention, since manufacturing costs and time may be reduced, productivity may be improved.

What is claimed is:

1. A method of preparing an electrode assembly, the method comprising:
    preparing a single current collector;
    coating both sides of the single current collector with a cathode active material and an anode active material alternating with one another to integrally form a plurality of anode patterns and cathode patterns on each side of the single current collector and a plurality of non-coating portions on which the cathode active material and the anode active material are not coated;
    bending the plurality of non-coating portions into a vertical sectional zigzag shape to form bent non-coating portions;
    disposing a separator at respective interfaces between the cathode patterns and the anode patterns that face each other by the bending, and folding the single current collector; and
    cutting the bent non-coating portions.

2. The method of claim 1, wherein the electrode assembly is a layered electrode assembly.

3. The method of claim 1, further comprising drying and pressing the plurality of anode patterns and cathode patterns before the bending.

4. The method of claim 1, wherein widths of the cathode pattern and the anode pattern are same.

5. The method of claim 1, wherein a width of the non-coating portion is in a range of 5% to 10% based on a total width of the cathode patterns or the anode patterns.

6. The method of claim 1, wherein a marking for facilitating the bending is formed in the non-coating portions.

7. The method of claim 1, further comprising non-coating portions, on which the electrode active materials are not coated, at one side end or both side ends of the current collector to attach electrode leads.

8. The method of claim 1, wherein the separator is a porous thin film formed of an insulating material.

9. The method of claim 1, wherein a lamination structure, in which unit cells composed of the cathode patterns/the separator/the anode patterns are alternatingly stacked, is formed after the folding.

10. The method of claim 1, wherein the cutting is performed by a cutting or punching method.

11. An electrode assembly prepared by the method of claim 1.

12. A secondary battery comprising the electrode assembly of claim 11.

13. The secondary battery of claim 12, wherein the secondary battery is a lithium-ion polymer secondary battery.

14. The method of claim 4, wherein a width of the non-coating portions is in a range of 5% to 10% based on a total width of the cathode patterns or the anode patterns.

15. The method of claim 6, wherein the marking comprises one or more holes that are perforated at predetermined spaced intervals along a portion to be folded.

* * * * *